… … …

United States Patent Office 3,096,375
Patented July 2, 1963

3,096,375
THIOETHERS
John Robert Campbell, St. Louis, Mo., and Ernest E. Campaigne, Bloomington, Ind., assignors to Monsanto Chemical Company, St. Louis, Mo., a corporation of Delaware
No Drawing. Filed Nov. 6, 1961, Ser. No. 150,178
18 Claims. (Cl. 260—609)

This invention relates to a novel process for preparing thioethers by reacting a halogen-substituted hydrocarbon, a hydrocarbon disulfide, and copper in a polar solvent.

While not completely understood, the method of this invention apparently involves cleavage of the hydrocarbon disulfide to form an intermediate cuprous salt, Cu—S—R, where R is the hydrocarbon group cleaved from the disulfide, R—S—S—R, which salt, in turn, reacts with a dihalogen-substituted hydrocarbon, $R_1X_2$, to give the product, R—S—$R_1$—S—R, or when a monohalohydrocarbon is used, the product, R—S—$R_1$. However, it has been found that a polar solvent for the intermediate cuprous salt, which solvent boils above about 125° C. at atmospheric pressure which is taken as 760 mm. of mercury, must be used in order for the reaction to proceed to any practical degree of completion.

The following non-limiting examples are given to further illustrate the novel procedure of the invention, wherein "parts" are parts by weight.

Example 1

Into a suitable reaction vessel equipped with a reflux head and condenser and having means for the addition and removal of solids and liquids, means for heating the vessel contents, means for the measurement of liquid and vapor temperatures, and means for agitation of the vessel contents, there were charged 50.6 parts of p-tolyldisulfide, 48.5 parts of m-dibromobenzene, 26 parts of powdered copper, and 700 ml. of dimethylacetamide. The resulting mixture was heated, with agitation, to reflux temperature, 165–170° C. (reaction commenced at about 130° C. as evidenced by solids separation), and maintained at that temperature for about three hours. Thereafter all the solvent was removed by distillation and the residue taken up in benzene. The benzene layer was then filtered to remove undissolved salts and washed with water. The benzene was then distilled to leave an oily material which yielded, upon fractionation, 54.1 parts (84% yield) of m-di(p-tolylmercapto)benzene, a light yellow oil, B. P. 240–250° C. at 0.3 mm. Upon standing, this product crystallized. After recrystallization from isopropanol, the melting point of the product was determined to be 91–92° C.

Example 2

Using the reaction system described above, a mixture of 49.3 parts of o-nitrophenyl disulfide, 37.8 parts of m-dibromobenzene, 20.3 parts of powdered copper, and 300 ml. of dimethylacetamide was heated, with agitation, to reflux (165° C.). The mixture became thick and, accordingly, additional solvent (400 ml.) was added. After maintaining the reaction mass at reflux for about three hours, the solvent was distilled, leaving a viscous residue to which water and benzene were added, forming two immiscible layers. The layers were separated; the benzene layer was filtered and then passed through a packed column containing alumina. A portion of the benzene was removed by heating (down to about 300 ml.), and the remaining solution was allowed to cool to room temperature. A dark yellow solid which precipitated was collected, dried, and recrystallized from carbon tetrachloride to give m-di(o-nitrophenylmercapto)benzene, M.P. 151–152° C.

Example 3

Using the reaction system described above, a mixture of 21.8 parts of phenyl disulfide, 31.4 parts of bromobenzene, 12.7 parts of powdered copper, and 500 ml. of dimethylacetamide was heated, with agitation, to 135–140° C. where reaction began. After about two hours, the temperature of the reaction mass was raised to about 160° C. for several hours, and then excess solvent was distilled to leave a thick residue which was diluted with benzene and water. The resulting mixture was then filtered. After washing the benzene layer with water, the benzene was removed by evaporation to yield 32.2 parts (86.5% yield) of diphenyl sulfide, a colorless liquid, B.P. 139–141° C. at 9 mm.

Example 4

Example 3 is repeated except that dimethylformamide is used in place of dimethylacetamide and the maximum temperature is about 150° C., requiring a slightly longer reaction time. The yield of diphenyl sulfide is essentially the same as was obtained in Example 3.

Example 5

Using the reaction system described above, a mixture of 27.2 parts of m-dibromobenzene, 25.2 parts of phenyl disulfide, 14.7 parts of powdered copper, and 150 ml. of dimethylacetamide was heated, with agitation, to 135–140° C. and maintained at such temperatures for about two hours and then heated at about 165° C. for about four hours. After cooling the reaction mass to room temperature, it was diluted with benzene and water. The resulting mixture was filtered and the benzene portion was then washed with water, after which the benzene was removed by evaporation to give a crude oil which was fractionated to yield 27.1 parts (80.2% yield) of m-diphenylmercaptobenzene, a light yellow oil, B.P. 180–185° C. at 0.35 mm.

Example 6

Using the reaction system described above, a mixture of 27.8 parts of p-methoxyphenyl disulfide, 14.7 parts of o-dichlorobenzene, 12.7 parts of powdered copper, and 500 ml. of dimethylacetamide was heated, with agitation, to reflux (165° C.) and maintained there for several hours. Thereafter the solvent was distilled, leaving a viscous residue. This residue was purified in the manner of Example 4 to yield 21.2 parts of o-di(p-methoxyphenylmercapto) benzene, a light yellow oil.

Example 7

Using the aforedescribed reaction system and procedure, 27.2 parts of m-dibromobenzene, 25.2 parts of phenyl disulfide, 14.7 parts of copper powder, and 450 ml. of diethylaniline were used to prepare m-diphenylmercaptobenzene, a yellow oil, B.P. 175–195° C. (0.7–0.8) mm.).

Example 8

Using the previously described reaction system and procedure, 21.8 parts of phenyl disulfide, 23.6 parts of p-dibromobenzene, 12.7 parts of powdered copper, and 450 ml. of ethylene glycol were used to prepare p-diphenylmercaptobenzene, a white crystalline material which, after recrystallization from ethanol, had a melting point of 82–83° C.

Example 9

Using the previously described reaction system and procedure, 24.6 parts of benzyl disulfide, 23.6 parts of m-dibromobenzene, 12.7 parts of powdered copper, and 500 ml. of dimethylacetamide were heated together for about 15 hours to prepare 12 parts of m-bis(benzylmercapto)benzene which, after recrystallization from ethanol, had a melting point of 61–62° C.

Example 10

Using the previously described reaction system, a mixture of 35.1 parts of n-decyl disulfide, 25.3 parts of benzyl chloride, 12.7 parts of copper powder, and 300 ml. of dimethylacetamide was heated to 110–130° C. and maintained at those temperatures for two to three hours. The temperature was then increased to 165–170° C. and the reaction mass held at those temperatures for about 16 hours. Thereafter the solvent was removed by distillation to leave a thick residue which was diluted with water and benzene. The solids present were removed by filtration, and a water layer and a benzene layer were allowed to separate. The benzene layer was washed with water, and then the benzene was evaporated to leave a residue which, upon filtration, yielded 32.4 parts of benzyl n-decyl sulfide, a colorless oil, B.P. 135–140° C. at 0.5 mm.

Example 11

Using the reaction system and procedure described above, 35.7 parts of n-butyl disulfide, 62.8 parts of bromobenzene, 25.4 parts of copper powder, and 500 ml. of dimethylacetamide were used to prepare 33.7 parts of n-butyl phenyl sulfide, a colorless liquid, B.P. 123–129° C. at 25 mm.

Example 12

Using the reaction system described above, 21.8 parts of phenyl disulfide, 46.6 parts of n-tetradecyl chloride, 12.7 parts of copper powder, and 300 ml. of dimethylacetamide were charged and heated to 120° C., maintained within that temperature for two to three hours, and then heated at reflux (165–170° C.) for about four hours. Thereafter dimethylacetamide was distilled, leaving a thick residue. The residue was diluted with benzene and water and the resulting mixture filtered. After separation of the benzene, the residue was washed with water, dried, and fractionated to yield 53.6 parts of the colorless n-tetradecyl phenyl sulfide, B.P. 147–152° C. at 0.3 mm.

The solvents useful in the process of this invention are those polar materials boiling above about 125° C. which can be represented by the structure

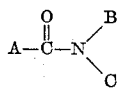

where A is, for example, hydrogen, an aliphatic hydrocarbon radical (e.g., alkyl or benzyl), or an aromatic hydrocarbon radical (e.g., phenyl or naphthyl), and B and C are selected from an aliphatic hydrocarbon radical and an aromatic hydrocarbon radical. Alternatively, B and C can, together with the nitrogen atom, form a carbon- and nitrogen-containing heterocyclic, five- or six-membered ring, or A and B can, together with the nitrogen atom and the carbonyl carbon adjacent to the nitrogen atom, form a five- or six-membered heterocyclic carbon- and nitrogen-containing ring. Examples of suitable compounds falling within the compounds represented by the above structure are the various dialkyl acid amides (e.g., dimethylformamide, dimethylacetamide, dimethylpropionamide, dimethylbutyramide, dimethylvaleramide, dimethylcaproamide, diethylformamide, diethylacetamide, diethyl-propionamide, dipropylvaleramide, dimethylbenzamide), the anilides (e.g., N-methylbenzanilide, N-phenylacetanilide), benzoylpiperidine, N,N-diphenylacetamide, acetylpiperidine, N,N-diphenylformamide, N-methyl-N-naphthylacetamide, N-acetylpyrrole, acetylpyridine, N-methyl-alpha-pyridone, N-methylpyrrolidone, and the like. Additional solvents are ethylene glycol, quinoline, and the dialkylanilines (e.g., dimethylaniline, diethylaniline, dibutylaniline) and the like. The usefulness of any specific solvent which is polar and which boils above about 125° C. can, of course, be readily determined by attempting to dissolve said cuprous salts therein.

In the method of the invention, the physical form of the copper is not critical, and thus the copper can be in the form of plates, beads, thin strips, granules, powder, etc. However, the powdered form is preferred since that form provides the most exposed surface area and, therefore, does not hinder or limit the reaction. The amount of copper used should be, for best results, about two mols per mol of aryl disulfide, since any great deviation from this amount causes a reduction in yield.

Generally the temperatures used in the method of this invention can range from about 125° C. to about 250° C. or higher, the lower temperatures requiring longer reaction times and vice versa. The choice of solvent will, of course, influence the maximum temperature which can be used if the complications of operating under pressure are to be avoided.

In the practice of the method of this invention, other halogen-substituted hydrocarbons can be used in addition to those used in the foregoing examples to illustrate the invention; for example, iodobenzene chlorobenzene, o-dibromobenzene, p-dibromobenzene, m-diodobenzene, p-diodobenzene, m - dichlorobenzene, p - dichlorobenzene, benzyl bromide, p-methoxybenzyl bromide, o-ethylbenzyl chloride, dichlorobutane, octyl bromide, dimethylbutyl bromide, stearyl chloride, tolyl iodide, tolyl bromide, dibromotoluene, xylyl chloride, naphthyl iodide, naphthyl bromide, p-nitrophenyl bromide, o-chlorophenyl iodide, p-chlorobenzoic acid, o-bromobenzoic acid, o-chlorotoluic acid, nitrobenzyl chloride, and the like. Also, in addition to the various disulfides used above, there can be used such disulfides as m-xylyl disulfide, p-xylyl disulfide, o-xylyl disulfide, o-tolyl disulfide, m-tolyl disulfide, various alkoxyphenyl disulfides (e.g., o-methoxyphenyl disulfide, m-methoxyphenyl disulfide, p-ethoxyphenyl disulfide, o-propoxyphenyl disulfide, m-isopropoxyphenyl disulfide, p-butoxyphenyl disulfide, o-butoxyphenyl disulfide, m-hexoxyphenyl disulfide, o-heptoxyphenyl disulfide, p-octoxyphenyl disulfide, m-decoxyphenyl disulfide, o-dodecoxyphenyl disulfide, and the like), 1-naphthyl disulfide, 2-naphthyl disulfide, and the various other alkylphenyl disulfides (e.g., o-ethylphenyl disulfide, p-isopropylphenyl disulfide, o-isopropylphenyl disulfide, m-isopropylphenyl disulfide, p-butylphenyl disulfide, o-isobutylphenyl disulfide, m-tert.-butylphenyl disulfide, o-tert.-butylphenyl disulfide, p-tert.-butylphenyl disulfide, o-diisopropylphenyl disulfide, p-amylphenyl disulfide, m-hexylphenyl disulfide, o-octylphenyl disulfide, p-octylphenyl disulfide, the di-tert.-butylphenyl disulfides, p-nonylphenyl disulfide, p-decylphenyl disulfide, m-decylphenyl disulfide), 3-nitro-4-tolyl disulfide, 2-nitro-4-tolyl disulfide, 5-nitro-2,4-xylyl disulfide, o-nitrophenyl disulfide, p-nitrophenyl disulfide, m-nitrophenyl disulfide, 3-cyano-4-tolyl disulfide, o-cyanophenyl disulfide, m-cyanophenyl disulfide, p-cyanophenyl disulfide, o-carboxyphenyl disulfide, p-carboxyphenyl disulfide, m-carboxyphenyl disulfide, and esters thereof (e.g., o-carbethoxyphenyl disulfide, p-carbutoxyphenyl disulfide, m-carboctoxyphenyl disulfide), dibenzyl disulfide, di-(alkylbenzyl) disulfide (e.g., di(methylbenzyl) disulfide), di(alkoxybenzyl) disulfide (e.g., di(ethoxybenzyl) disulfide), alkyl disulfides (e.g., propyl disulfide, isobutyl disulfide, stearyl disulfide), and the like.

From the foregoing, it is evident that by the process of this invention it is possible to produce various thioethers in addition to those exemplified above, such as phenyl tolyl sulfide, phenyl xylyl sulfide, tolyl xylyl sulfide, chlorophenyl tolyl sulfide, o-di(m-tolylmercapto)benzene, p-di-(p-tolylmercapto) benzene, o-diphenylmercaptobenzene, p-diphenylmercaptobenzene, other dinitrophenylmercaptobenzenes (e.g., p-di(p-nitrophenylmercapto)benzene, o-di-(o-nitrophenylmercapto)nitrobenzene), other dialkoxyphenylmercaptobenzenes (e.g., p-di(o-methoxyphenylmercapto)benzene, o - di(p - ethoxyphenylmercapto)benzene, m-di(m-isopropoxyphenylmercapto)benzene, o-bis- (diisopropoxyphenylmercapto)benzene, m-bis(di-tert.-butylphenylmercapto)benzene, and p-di(decoxyphenylmercapto)benzene), other di(alkylphenylmercapto)benzenes, (e.g., p-di(p-isopropylphenylmercapto)benzene, o-di-(m-butylphenylmercapto)benzene, m-di(p-tert-butylphenylmercapto)benzene, p-bis(diisopropylphenylmercapto)benzene, and o-bis(di-tert.-butylphenylmercapto)benzene), the dinaphthylmercaptobenzenes (e.g., p-di(1-naphthylmercapto)benzene, m-di(1-naphthylmercapto)benzene, p-di(2-naphthylmercapto)benzene, and m-di(2-naphthylmercapto)benzene), o-di(o-cyanophenylmercapto)benzene, and other di(cyanophenylmercapto)benzenes, p-di(o-carboxyphenylmercapto)benzene, p-di(o-carboxymethylphenylmercapto)benzene, 1,2-di(nonylphenylmercapto)-3-carboxybenzene, m-di(o-carbethoxyphenylmercapto)benzene, and the like.

The thioethers which can be produced by the method of this invention are useful as functional fluids, even at high temperatures of the order of 700° F., which are used as force transmission fluids for the transmission of pressure, power or torque in fluid pressure or torque actuated mechanisms, such as, for example, the "hydraulic fluids" used for transmitting fluid pressure to the ram cylinders of hydraulic presses or in devices for the absorption and dissipation of energy such as shock absorbers or recoil mechanisms, or for transmission of torque through torque converter types of fluid couplings. The functional fluids of this invention can also be used as damping fluids, which are the liquid compositions used for damping mechanical vibrations or resisting other rapid mechanical movements. The functional fluids of this invention are also suitable for use as synthetic lubricants between relatively moving mechanical parts, as bases for synthetic greases, as component parts of mixtures used as functional fluids, and as the liquid material in the filters of air conditioning systems. When used as functional fluids, thioethers can be used per se or they can be used in combination with various addition agents, such as oxidation inhibitors, rust inhibitors, anti-foaming agents, detergents, viscosity index improvers compatible therewith, etc., whenever specific uses require such addition agents. In some cases, the compounds of the invention are solids at room temperature and, accordingly, are suitable as functional fluids at temperatures above their melting point.

The term "hydrocarbon radical" is used herein in its broader sense, in that a particular R group can also contain substituents other than carbon and hydrogen; for example, alkoxy, chloro, nitro, hetero atoms such as oxygen, etc., and the like, which are non-reactive or at least which do not interfere with the desired reaction. A compound containing a hydrocarbon radical that is substituted with a non-interfering group is the equivalent, for use in the process of the present invention, of the compound corresponding to the unsubstituted hydrocarbon radical.

While the invention has been described by reference to various specific examples and embodiments, it is understood that said invention is not limited thereto and that it can be variously practiced within the scope of the following claims.

This application is a continuation in part of application Serial No. 104,220, filed April 20, 1961, and now abandoned.

What is claimed is:

1. A process for preparing thioethers comprising reacting
   (a) a hydrocarbon disulfide free from olefinic and acetylenic unsaturation,
   (b) a halogen-substituted hydrocarbon represented by the structure, $R_1(X)_n$, where $R_1$ is a hydrocarbon radical free from olefinic and acetylenic unsaturation, X is selected from chlorine, bromine, and iodine, and $n$ is selected from 1 and 2, and
   (c) copper in a solvent boiling above about 125° C. at atmospheric pressure and represented by the structure,

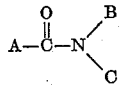

where A is selected from hydrogen, aliphatic hydrocarbon radicals, and aromatic hydrocarbon radicals, and B and C are selected from aliphatic hydrocarbon radicals and aromatic hydrocarbon radicals, provided, however, that B and C can, together with the nitrogen atom, form a carbon- and nitrogen-containing heterocyclic ring, and provided further that A and B can, together with the nitrogen atom and the carbonyl carbon adjacent thereto, form a heterocyclic carbon- and nitrogen-containing ring, said ring in each case containing five to six members.

2. A process of claim 1 where the solvent is a dialkyl acid amide.

3. A process of claim 2 where the solvent is dimethylacetamide.

4. A process of claim 1 where the solvent is N-methyl-2-pyrrolidone.

5. A process for preparing thioethers comprising reacting
   (a) a phenyl disulfide,
   (b) a halogen-substituted hydrocarbon represented by the structure, $R_1(X)_n$, where $R_1$ is a hydrocarbon radical free from olefinic and acetylenic unsaturation, X is selected from chlorine, bromine, and iodine, and $n$ is selected from 1 and 2, and
   (c) copper in a solvent boiling above about 125° C. at atmospheric pressure and represented by the structure,

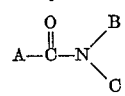

where A is selected from hydrogen, aliphatic hydrocarbon radicals, and aromatic hydrocarbon radicals, and B and C are selected from aliphatic hydrocarbon radicals and aromatic hydrocarbon radicals, provided, however, that B and C can, together with the nitrogen atom, form a carbon- and nitrogen-containing heterocyclic ring, and provided further that A and B can, together with the nitrogen atom and the carbonyl carbon adjacent thereto, form a heterocyclic carbon- and nitrogen-containing ring, said ring in each case containing five to six members.

6. A process of claim 5 where $n$ is 2 and the solvent is a dialkyl acid amide.

7. A process of claim 6 where the dialkyl acid amide is dimethylformamide.

8. A process of claim 6 where the dialkyl acid amide is dimethylacetamide.

9. A process of claim 5 where $n$ is 2 and the solvent is N-methyl-2-pyrrolidone.

10. A process for preparing diphenylmercaptobenzenes comprising reacting
    (a) phenyl disulfide,
    (b) a halogen-substituted hydrocarbon represented by the structure, $R_1(X)_2$, where $R_1$ is phenylene, and the halogen is selected from chlorine, bromine, and iodine, and
    (c) copper in dimethylacetamide.

11. A process of claim 5 where $n$ is 1 and the solvent is a dialkyl acid amide.

12. A process of claim 11 where the dialkyl acid amide is dimethylformamide.

13. A process for preparing benzylmercaptobenzenes comprising reacting
    (a) benzyl disulfide,
    (b) a halogen-substituted hydrocarbon represented by the structure, $R_1(X)_2$, where $R_1$ is phenyl, and the halogen is selected from chlorine, bromine, and iodine, and 14. A process for preparing thioethers comprising reacting
 (a) an alkyl disulfide,
 (b) a halogen-substituted hydrocarbon represented by the structure, $R_1(X)_n$, where $R_1$ is a hydrocarbon radical free from olefinic and acetylenic unsaturation, X is selected from chlorine, bromine, and iodine, and $n$ is selected from 1 and 2, and
 (c) copper
in a dialkyl acid amide.

15. A process for preparing thioethers comprising reacting
 (a) an alkyl disulfide,
 (b) benzyl chloride, and
 (c) copper
in dimethylacetamide.

16. A process for preparing butyl phenyl sulfide comprising reacting
 (a) butyl disulfide,
 (b) bromobenzene, and
 (c) copper
in dimethylacetamide.

17. A process for preparing thioethers comprising reacting
 (a) a phenyl disulfide,
 (b) a halogen-substituted hydrocarbon represented by the structure, $R_1(X)_n$, where $R_1$ is alkyl, X is selected from chlorine, bromine, and iodine, and $n$ is selected from 1 and 2, and
 (c) copper
in a dialkyl acid amide.

18. A process for preparing tetradecyl phenyl sulfide comprising reacting
 (a) phenyl disulfide,
 (b) tetradecyl chloride, and
 (c) copper
in dimethylacetamide.

References Cited in the file of this patent

UNITED STATES PATENTS 2,347,393    Bousquet _____ Apr. 25, 1944